United States Patent
Huber

(10) Patent No.: US 6,449,073 B1
(45) Date of Patent: *Sep. 10, 2002

(54) OPTICAL COMMUNICATION SYSTEM

(75) Inventor: David R. Huber, Glenwood, MD (US)

(73) Assignee: Corvis Corporation, Columbia, MD (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,562

(22) Filed: Jul. 21, 1998

(51) Int. Cl.$^7$ ............ H04J 14/00; H04J 14/02; H04J 14/08; G02B 6/26
(52) U.S. Cl. ............ 359/128; 359/117; 359/127; 359/130; 359/124; 359/134; 359/139; 385/16
(58) Field of Search ............ 359/128, 117, 359/127, 130, 134, 160, 125, 124, 131

(56) References Cited

U.S. PATENT DOCUMENTS

| | | | |
|---|---|---|---|
| 4,039,249 A | 8/1977 | Kaminow et al. | 350/96 |
| 4,725,110 A | 2/1988 | Glenn et al. | 350/3.61 |

(List continued on next page.)

FOREIGN PATENT DOCUMENTS

| | | |
|---|---|---|
| EP | 0638837 A1 | 2/1995 |
| EP | 0849968 A2 | 6/1998 |
| EP | 0851545 A2 | 7/1998 |
| EP | 0851705 A2 | 7/1998 |
| JP | 10051382 A | 2/1998 |
| JP | 10056661 A | 2/1998 |
| WO | WO 97/06614 | 2/1997 |

OTHER PUBLICATIONS

Naohide, Negatsu, et al., Optical Path Accomodation Design Enabling Cross–Connect System Scale Evaluation, IEICE Transactions on Communications, Institute of Electronics Information and Comm. Eng., Tokyo, JP, vol. E78–B, No. 9, $1^{st}$ Sep. 1995, pp. 1339–1343, ISSN 0916–8516.

(List continued on next page.)

*Primary Examiner*—Jason Chan
*Assistant Examiner*—M. R. Sedighian

(57) ABSTRACT

Apparatuses and methods are disclosed for use in optical communication systems. An optical system of the present invention includes an optical transmitter, an optical receiver, and an optical processing node optically connecting the transmitter and the receiver. The optical processing node includes at least one waveband selector configured to selectively pass at least one optical waveband of information including a plurality of information carrying wavelengths from the transmitter to the receiver. In an embodiment, the optical processing node includes a switch configured to separate an optical signal into optical wavebands of information and selectively pass the optical wavebands to the receiver without separating the plurality of information carrying wavelengths into individual wavelengths. In an embodiment of the optical transmission system, a plurality of nodes containing optical transmitters, receivers, and/or switching equipment are interconnected using optical processing nodes to form the network. The assignment of wavelengths to information and to destination can be performed at the client system interface with the optical network to provide for wavelength and waveband management without wavelength conversion.

34 Claims, 10 Drawing Sheets

U.S. PATENT DOCUMENTS

| | | | | |
|---|---|---|---|---|
| 4,728,165 A | | 3/1988 | Powell et al. | 350/364 |
| 4,821,255 A | | 4/1989 | Kobrinski | 370/3 |
| 4,989,200 A | | 1/1991 | Olshansky et al. | 370/3 |
| 5,007,705 A | | 4/1991 | Morey et al. | 350/96.29 |
| 5,101,450 A | | 3/1992 | Olshansky | 385/3 |
| 5,121,450 A | | 6/1992 | Eichen et al. | 385/22 |
| 5,126,874 A | | 6/1992 | Alfano et al. | 359/240 |
| 5,134,509 A | | 7/1992 | Olshansky et al. | 359/132 |
| 5,136,670 A | | 8/1992 | Shigematsu et al. | 385/42 |
| 5,159,601 A | | 10/1992 | Huber | 372/6 |
| 5,181,134 A | | 1/1993 | Fatehi et al. | 359/117 |
| 5,191,586 A | | 3/1993 | Huber | 372/6 |
| 5,191,626 A | * | 3/1993 | Stern | 385/24 |
| 5,202,786 A | | 4/1993 | Boyle et al. | 359/243 |
| 5,218,651 A | | 6/1993 | Faco et al. | 385/4 |
| 5,268,910 A | | 12/1993 | Huber | 372/6 |
| 5,283,686 A | | 2/1994 | Huber | 359/337 |
| 5,301,058 A | | 4/1994 | Olshansky | 359/188 |
| 5,321,707 A | | 6/1994 | Huber | 372/6 |
| 5,392,154 A | | 2/1995 | Chang et al. | 359/341 |
| 5,400,166 A | | 3/1995 | Huber | 359/173 |
| 5,432,632 A | | 7/1995 | Watanabe | 359/191 |
| 5,446,809 A | | 8/1995 | Fritz et al. | 385/17 |
| 5,452,116 A | | 9/1995 | Kirkby et al. | 359/124 |
| 5,457,556 A | | 10/1995 | Shiragaki | 359/117 |
| 5,475,780 A | | 12/1995 | Mizrahi | 385/37 |
| 5,479,256 A | | 12/1995 | Tamai et al. | 356/346 |
| 5,528,406 A | | 6/1996 | Jeffrey et al. | 359/128 |
| 5,532,855 A | | 7/1996 | Kato et al. | 359/117 |
| 5,532,864 A | | 7/1996 | Alexander et al. | 359/177 |
| 5,570,218 A | | 10/1996 | Sotom | 359/117 |
| 5,579,143 A | | 11/1996 | Huber | 359/130 |
| 5,583,957 A | | 12/1996 | Blow | 385/21 |
| 5,596,436 A | | 1/1997 | Sargis et al. | 359/132 |
| 5,600,473 A | | 2/1997 | Huber | 359/179 |
| 5,608,825 A | | 3/1997 | Ip | 385/24 |
| 5,627,925 A | | 5/1997 | Alferness et al. | 385/17 |
| 5,633,961 A | | 5/1997 | Kirkby et al. | 385/16 |
| 5,633,965 A | * | 5/1997 | Bricheno et al. | 385/37 |
| 5,636,304 A | | 6/1997 | Mizrahi et al. | 385/37 |
| 5,652,814 A | * | 7/1997 | Pan et al. | 385/24 |
| 5,706,375 A | * | 1/1998 | Mihailov | 385/24 |
| 5,712,932 A | * | 1/1998 | Alexander et al. | 385/24 |
| 5,742,416 A | * | 4/1998 | Mizrahi | 359/134 |
| 5,754,320 A | | 5/1998 | Watanabe et al. | 359/117 |
| 5,771,112 A | * | 6/1998 | Hamel et al. | 359/128 |
| 5,815,613 A | | 9/1998 | Fatehi et al. | 385/22 |
| 5,889,600 A | * | 3/1999 | McGuire | 359/128 |
| 5,933,552 A | * | 8/1999 | Fukushma et al. | 385/24 |
| 5,940,551 A | | 8/1999 | Oberg | 385/17 |
| 5,991,476 A | * | 11/1999 | Baney et al. | 385/16 |
| 6,049,418 A | * | 4/2000 | Srivastava et al. | 359/341 |
| 6,091,744 A | * | 7/2000 | Sorin et al. | 372/20 |
| 6,137,604 A | * | 10/2000 | Bergano | 359/124 |

OTHER PUBLICATIONS

O'Mahony, M.J., et al., "The Design of a European Optical Network", Journal of Lightwave Technology, IEEE Log No. 9411015, New York, US, $1^{st}$ May 1995, vol. 13, No. 5, pp. 817–828, ISSN 0733-8724.

Dumortier, P., et al., "Guidelines for Scalable Optical Telecommunication Networks", Singapore, Nov. 14–16, 1995, New York, IEEE, US, $14^{th}$ Nov. 1995, pp. 1012–1017, ISBN–0–7803–2510–9.

Stern, T.E., "Linear Lightwave Networks: How Far Can They Go?", Proceedings of the Global Telecommunications Conference and Exhibition (Globecom), US, New York, $2^{nd}$ Dec. 1990, pp. 1866–1872, ISBN 0–87942–632–2.

Labourdette, J.F., "Performance Impact of Partial Reconfigurability in Lightwave Networks", Fourteenth Annual Joint Conference of the IEEE Computer and Communications Societies, Boston Apr. 2–6, 1995, Los Alamitos, IEEE Comp. Soc. Press, US, vol. CONF. 14, Apr. 1995, pp. 683–691, ISBN 0–7803–2524–9.

Yamanaka, N., et al., "Wavelength Path Network Management Scheme for Multimedia Photonic Network" IEICE Transactions on Communications, Jul. 1993, Japan, vol. E76–B, No. 7, pp. 731–735, ISSN 0916–8516.

Hall, K.L. et al., 100 Gb/s All–Optical Logic, OFC '98 Post–Deadline Paper PD5–1–PD5–3.

Janos, M. et al., Transient Transmission Notches Induced in $Er^{+3}$ Doped Optical Fibre Bragg Gratings, p. 245, Electronic Letters, $1^{st}$ Feb. 1996, vol. 32, No. 3.

Di Pasquale, F. et al., Pump Controlled All–Optical Switching by Using High–Concentration $Er^{+3}$ Doped Nonlinear Waveguides, p. 232–3, Electronics Letters, $3^{rd}$ Feb. 1994, vol. 30, No. 3.

Wey, J.S., et al., Investigation of Dynamic Gratings in Erbium–Doped Fiber for Optical Bit Pattern Recognition, Conference On Lasers and Electro–Optics (CLEO '97), May 18–23, 1997, pp. 443, 444, 1997 OSA Technical Digest Series, vol. 11, Conference Edition.

* cited by examiner

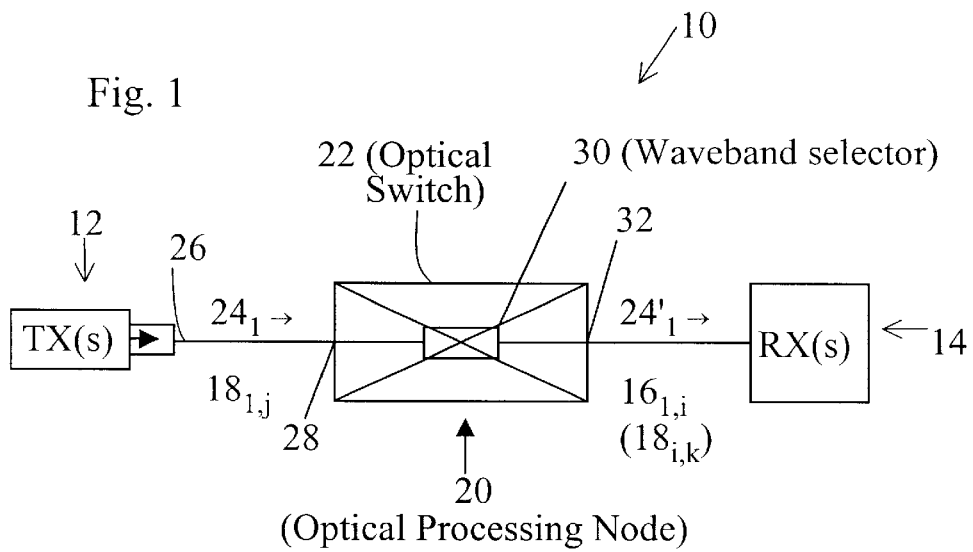
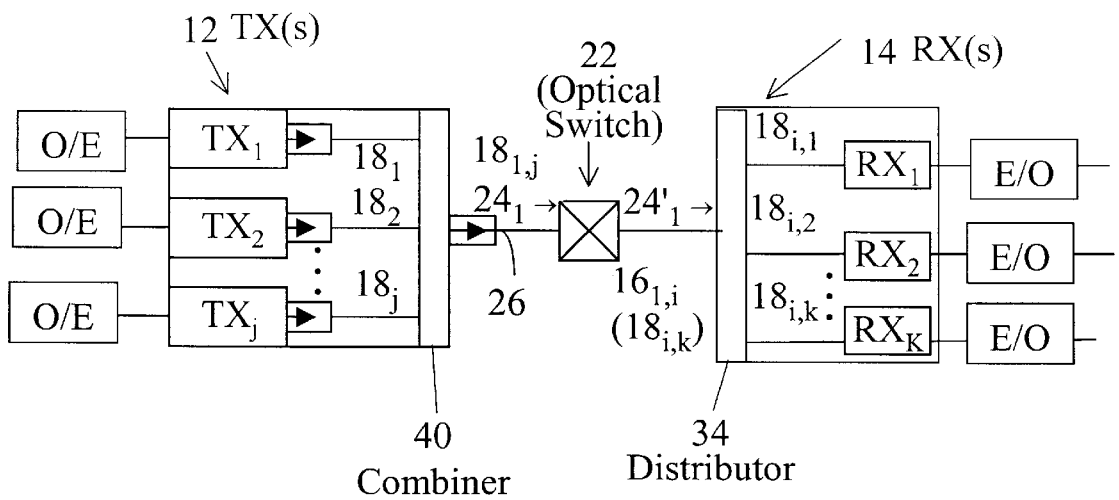

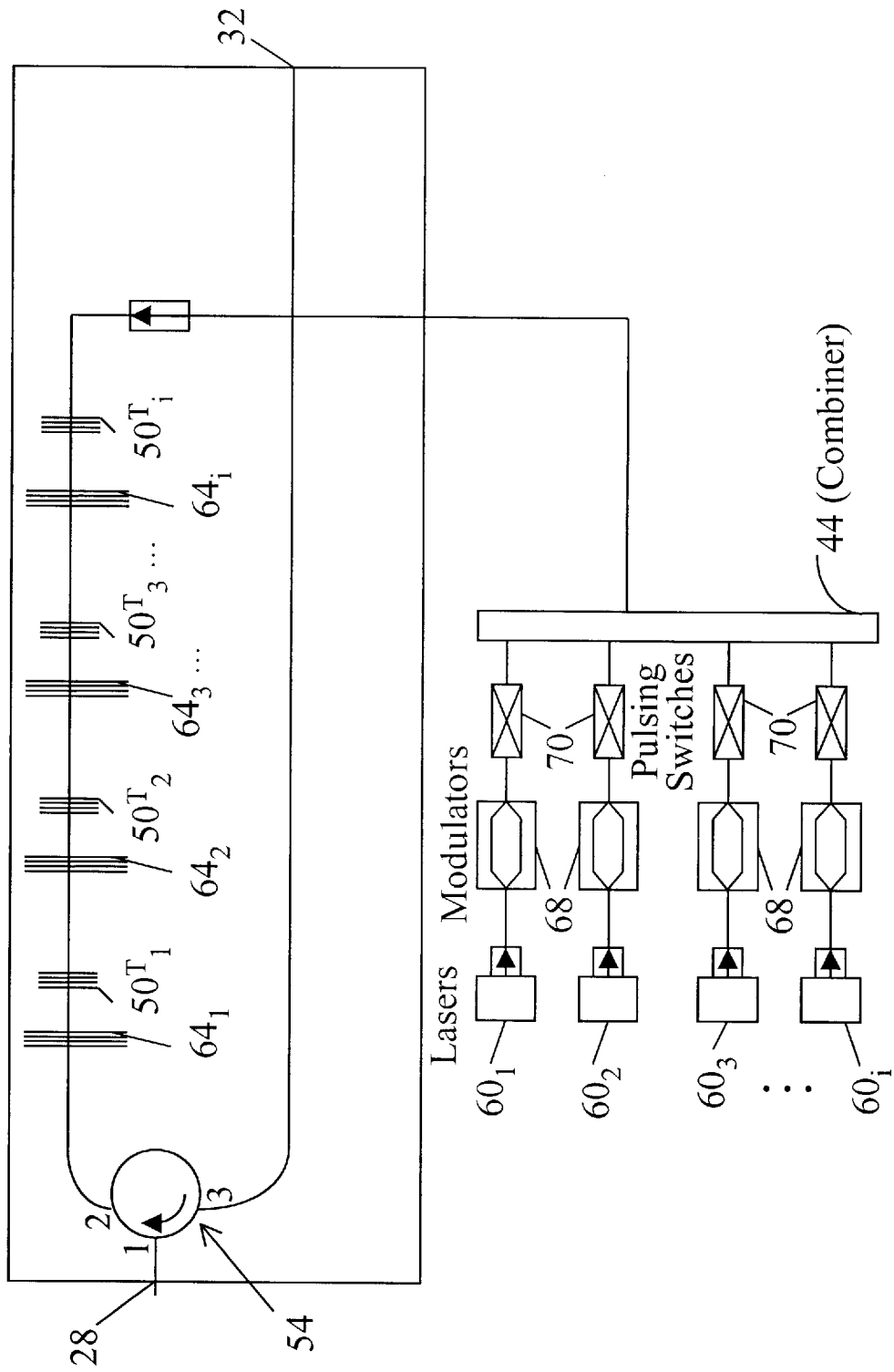

OPTICAL COMMUNICATION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is directed generally to network, transmission and communication systems. More particularly, the invention relates to optical information network, transmission and communication systems and optical components, such as cross connect switches, add/drop devices, demultiplexers, and multiplexers, for use therein.

The development of digital technology has provided electronic access to a vast amount of information. The increased access to information has fueled an increasing desire to quickly obtain and process the information. This desire has, in turn, placed ever increasing demands for faster and higher capacity electronic information processing equipment (computers) and transmission networks and systems linking the processing equipment (i.e., telephone lines, cable television (CATV) systems, local, wide and metropolitan area networks (LAN, WAN, and MAN)).

In response to these demands, many transmission systems in use today either have been or will be converted from electrical to optical networks. Optical transmission systems provide substantially larger information transmission bandwidths than electrical systems, which provides for increased information transmission capacities.

Early optical transmission systems were developed as space division multiplex (SDM) systems. In early SDM systems, one signal was transmitted as a single optical wavelength in each waveguide, i.e., fiber optic strand. A number of waveguides were clustered to form a fiber optic cable that provided for the transmission of a plurality of signals in spaced relationship.

As transmission capacity demands increased, optical transmission and receiving equipment was developed that provided for time division multiplexed (TDM) transmission of a plurality of distinct optical signals in a single waveguide. Optical TDM systems are generally analogous to electrical TDM systems in that the signals are transmitted on a common line, but spaced in time. The transmission of the signals is in a known sequence allows the plurality of distinct signals to be separated after transmission.

A problem with TDM transmission is the transmission bandwidth in the waveguide increases with each additional multiplexed signal. For example, information can be transmitted through a waveguide via a first series of optical signals separated in time by an interval $\Delta t$. Additional information can also be transmitted over the same waveguide using a second series of optical signals during the time interval $\Delta t$ by merely offsetting the transmission of the first and second series of signals in time. While an optical signal in each series is only transmitted through the waveguide every $\Delta t$ interval, two signals, or n signals in the general case, are passing through the waveguide during each interval. Therefore, the overall transmission rate in TDM systems increases directly with the number of signals transmitted.

Signal transmission rates in fiber optic waveguides are generally limited by the interactions between the optical signal (i.e., light pulse) and microstructural features of the waveguide material. As the transmission rate is increased, signal dispersion in the fiber and other transmission effects deleterious to signal quality begin to occur as a result of the interactions.

Optical signals are typically transmitted in wavelengths that minimize dispersion in the fiber. For example, older optical systems are commonly operated around 1310 nm and employ SMF-28 fiber manufactured by Corning, or its equivalent, which has minimum dispersion at or near 1310 nm. Another type of fiber, known as dispersion shifted fiber, has its minimum dispersion at or near 1550 nm. A third type of fiber sold by Corning as LS fiber and by Lucent Technology as TrueWave has its minimum dispersion at or near 1550 nm. In addition to having different minimum dispersion wavelengths, each fiber has varying immunity to other signal degradation mechanisms, such as four wave mixing, at increased transmission rates.

The transmission rates at which the signal quality begins to degrade are substantially lower (<40 Gbps) than the capacity of the transmission and receiving equipment. Therefore, TDM systems, which increase capacity by increasing transmission rates, generally have only a limited potential for further increasing the capacity of optical transmission systems.

The development of wavelength division multiplex (WDM) transmission systems has provided a way to increase the capacity of optical systems without encountering the waveguide limitations present in TDM systems. In a WDM system, a plurality of optical signals including information carrying wavelengths are combined to produce a multiple wavelength signal that is transmitted through the system to a receiver. After the multiple wavelength signal is received, the information carrying wavelengths are separated from the multiple wavelength signal and provided to a corresponding plurality of destinations. Unlike TDM systems, only one WDM signal is transmitted during a time interval $\Delta t$, although each WDM signal contains a plurality of signals including information carrying wavelengths.

Also unlike TDM systems, the waveguide material does not realistically limit the information bandwidth that can be placed on a single optical fiber in a WDM system. One skilled in the art can also appreciate that the number of wavelengths that can be used to transmit information over a single waveguide is currently limited by the complexity of the transmission and receiving equipment required to generate, transmit, receive, and separate the multiple wavelength signal.

Currently, many optical transmission systems must convert the optical signal to an electrical signal during transmission to perform transmission functions, such as signal amplification and switching. The optical to electrical conversion, and vice versa, substantially limits the overall transmission speed of the network, and increases transmission losses in the network. Thus, it has been an industry goal to develop optical amplifiers and optical cross-connect switches to provide for high speed, all optical transmission systems.

The development of optical fiber amplifiers produced by doping the optical fiber with Erbium ions ($Er^{3+}$) or other elements has allowed for the elimination of electrical amplifiers and the requisite time delay and costs associated with signal conversion. In addition to simplifying and decreasing the cost of the equipment required to amplify a signal, optical fiber amplifiers have proven effective for amplifying a plurality of wavelengths without a commensurate increase in the complexity of the amplifier as additional wavelengths are included in the WDM signal.

Unlike optical amplifiers, optical cross-connect switches greatly increase in complexity as the number of waveguides entering and exiting the switch and the number of wavelengths per waveguide increases. As a result, the expansion of all optical systems has been somewhat inhibited by the lack of simple, efficient, and economically attractive optical cross-connect switching systems.

A number of optical cross-connect switches are based on one or more 1×2 signal splitters or 2×2 signal couplers used in conjunction with one or more wavelength filters, such as described in U.S. Pat. No. 5,446,809 issued to Fritz et al. The complexity of these types of switch increases not only with the number of inputs and outputs in the switch, but also with the number of wavelengths being switched. For example, if a 2×2 switch is provided to switch two eight wavelength WDM input signals to two output signals, the switch would have to include 32 gratings to allow all wavelengths to be switched. However, if a 4×4 switch is provided to switch four sixteen wavelength. WDM input signals to four output signals, 256 gratings will be required. In addition, the flexibility of the switch is limited because additional gratings or filters must be added to each waveguide connecting each input to each output of the switch for every wavelength that is to be switched.

Another complication is that different signals entering a switch at different input ports will often times be carried by the same wavelengths. The use of common wavelengths frequently occurs because optical signals are generally transmitted using a relatively narrow range of wavelengths that have been established by optical standards committees with the goal of minimizing transmission losses in a waveguide and allowing equipment standardization in the industry.

If two signals on a common wavelength from different inputs are switched to the same waveguide, both signals will be destroyed. The switch, therefore, must be designed to prevent the inadvertent destruction of signals transmitted to the switch on a common wavelength.

Switches can be provided that "block" the switching of certain wavelengths to prevent destruction of two signals on a common wavelength. Switches can also be provided with wavelength converters that are used to change the wavelength of a signal, in lieu of blocking the signal, to prevent the destruction of the signal. U.S. Pat. No. 5,627,925 issued to Alferness et al. discloses an example of a switch thaw includes wavelength converters to provide a nonblocking switch. As expected, the use of wavelength converters adds a further degree of complexity to the design and function of optical cross-connect switches.

An alternative to adding wavelength converters to provide a nonblocking switch is to limit the wavelengths used in the system. For example, U.S. Pat. No. 4,821,255 issued to Kobrinski discloses an optical system employing transmission systems that transmit data at a different wavelength to each destination receiving system, i.e., N wavelengths for N receiving systems. In this manner, the optical system does not require a nonblocking switch and the assignment of a specific wavelength to each receiving system allows for a passive optical connection ("hard wire") between a transmission demultiplexer and a receiving multiplexer.

In addition, the same N wavelengths can be transmitted by each transmitting system if the receiving system is coordinated to receive a different wavelength from each transmitting system. Wavelength coordination eliminates the need for wavelength converters and allows the same transmitters and receivers to be used in the system.

A difficulty with passive switching systems is that the streamlined nature renders the switch somewhat inflexible. For example, a specified wavelength is used to transmit signals between a transmission system and a receiving system. Therefore, it may be difficult to transmit multiple signals from one transmitting system to one receiving system at any one time. It is presumably possible to assign additional wavelengths to each of N transmitter/receiver combinations; however, for each wavelength added to each system, either $N^2$ hard wire connections must be made.

The problem of signal blockage can also be addressed by designing a system having excess transmission capacity. This would provide more available wavelengths than is required to meet current transmission requirements. However, in view of the continued expansion of communication networks the excess capacity may only be short term; therefore the ability to upgrade a system remains a desired feature of a switch.

Similarly, other optical components, such as add/drop devices, demultiplexers and multiplexers, used in optical processing nodes between the transmitter and receivers increase in complexity and cost as additional channels are added to the system. In addition, these components most likely have to be replaced when a system is reconfigured or additional channels are to be added to the system.

The continued advancement and development of communication systems is limited, at least in part, by the constraints placed upon optical systems by the current technology involved in optical processing systems. The elimination or reduction of these constraints is a primary concern of industry as the pace of communications continues to accelerate.

Accordingly, there is a need for optical systems and optical components that allow for increased network capacity and flexibility. One aspect of which is to reduce the complexity of the equipment and increase the efficiency of the transmission system.

BRIEF SUMMARY OF THE INVENTION

The apparatuses and methods of the present invention address the above needs and concerns for improved optical switches and systems. An optical transmission system of the present invention includes one or more optical signal transmitters and optical signal receivers optically communicating via one or more intermediate optical processing nodes. Each optical transmitter includes one or more optical sources, such as modulated lasers, and is configured to transmit information via one or more information carrying wavelengths. Each optical receiver is configured to receive one or more of the information carrying wavelengths using one or more various detection techniques, such as direct detection using optical wavelength filters and photodiodes, or indirect detection using coherent detectors.

The intermediate optical processing nodes include optical switches, add and/or drop devices including at least one waveband selector configured to pass and substantially prevent the passage of optical wavebands that include a plurality of information carrying wavelengths from the transmitter to the receiver. The optical processing nodes provide for information management and processing in wavebands, instead of separating individual information carrying wavelengths from the signal and individually processing each wavelength. In this manner, high capacity processing of the information can be achieved without the prior complexities involved with increasing capacity. The processing of pluralities of individual wavelengths further provides for accommodating varying numbers and distributions of individual information carrying wavelengths in the system without having to reconfigure or replace system components.

In an embodiment of the present invention, the optical processing node includes a switch providing cross connections between a plurality of transmitters and receivers. Optical signals including one or more information carrying wavelengths are transmitted to optical switch input ports and are distributed to optical switch output ports by splitting and/or waveband demultiplexing the optical signals depending upon the type of waveband selector used in the switch.

Waveband selectors include at least one switch, gate, or filter, such as an erbium or mechanical switch, a Bragg grating, or a Mach-Zehnder or Fabry-Perot filter. The waveband selectors are generally configured to pass one or more optical wavebands from the input port to the output port in one mode and/or to substantially prevent the passage the optical wavebands in another mode. A signal is generally considered to be substantially prevented from passage, if the signal is sufficiently attenuated such that a remnant of the attenuated signal passing through the waveband selector does not destroy signals that have been selectively passed through the optical processing node. For example, a 40 dB attenuation of a signal will generally be sufficient to prevent cross-talk interference between remnant signals and signals passing through the optical processing node.

In an embodiment, each input signal is waveband demultiplexed to separate the input signal into waveband signals. Each waveband signal is then split and each split waveband signal passed through a switch to a respective output port. In an embodiment, an erbium doped fiber is used as the switch in the waveband selector to pass, as well as to controllably amplify or attenuate, the split waveband signal to the output port when supplied with optical pump power. In the absence of pump power, the erbium fiber absorbs the waveband signal, which substantially prevents the passage of the signal. One or more optical combiners are provided at the output ports to combine split waveband signal from the waveband selector passing optical wavebands from the input ports.

The optical signal at each input port can also be demultiplexed according to a known destination of each waveband signal and the waveband signal is passed to the output port corresponding to the destination. The optical signals can be transmitted to the switch in wavelengths that are unique to the signal destination to avoid the use of wavelength converters in the optical system.

Bragg gratings, either reflective or transmissive, can be included in the waveband selector to switch any number of wavebands. The Bragg gratings of the present invention include one grating produced to reflect an entire waveband or a series of gratings operated in concert that piecewise correspond to the waveband. In an embodiment, tunable permanent Bragg gratings can be provided corresponding to each of the wavebands to allow for dynamic reconfiguration of the switch.

In addition, the optical processing node can include transient gratings to provide for additional reconfiguration of the processing node. Transient grating can be formed in the waveguide either by induction using a coupled circuit or via a writing circuit integrated with the transmission fiber.

In an embodiment of the optical transmission system, pluralities of nodes are interconnected to form a network. The nodes may contain optical transmitters, receivers, add and/or drop devices/ports, and/or switching equipment depending upon whether the node is an origination and/or a destination node, and whether it is a terminal or an intermediate node. In an embodiment, the network management system is provisioned to assign wavelengths to information that can be transmitted to destination nodes in a manner to obviate the need for wavelength conversion at the optical switch. Wavelength assignment can be static or dynamically performed via a network management system, for example, at the client system interface with the optical network. The optical switches cross connecting the nodes and add and/or drop ports are configured to respectively switch and add/drop the information carrying wavelengths in wavebands without separately switching the individual wavelengths.

Accordingly, the present invention addresses the aforementioned problems and provides apparatuses and methods to increase the efficiency and capacity of optical communication systems. These advantages and others will become apparent from the following detailed description.

BRIEF DESCRIPTION OF THE DRAWINGS

Embodiments of the present invention will now be described, by way of example only, with reference to the accompanying Figures wherein like members bear like reference numerals and wherein:

FIGS. 1–4 depict optical communication systems of the present invention;

FIGS. 9–11 depict transient grating waveband selectors of the present invention; and, FIGS. 12–13 depict multi-node optical communication networks of the present invention.

DETAILED DESCRIPTION OF THE INVENTION

Figure 2:
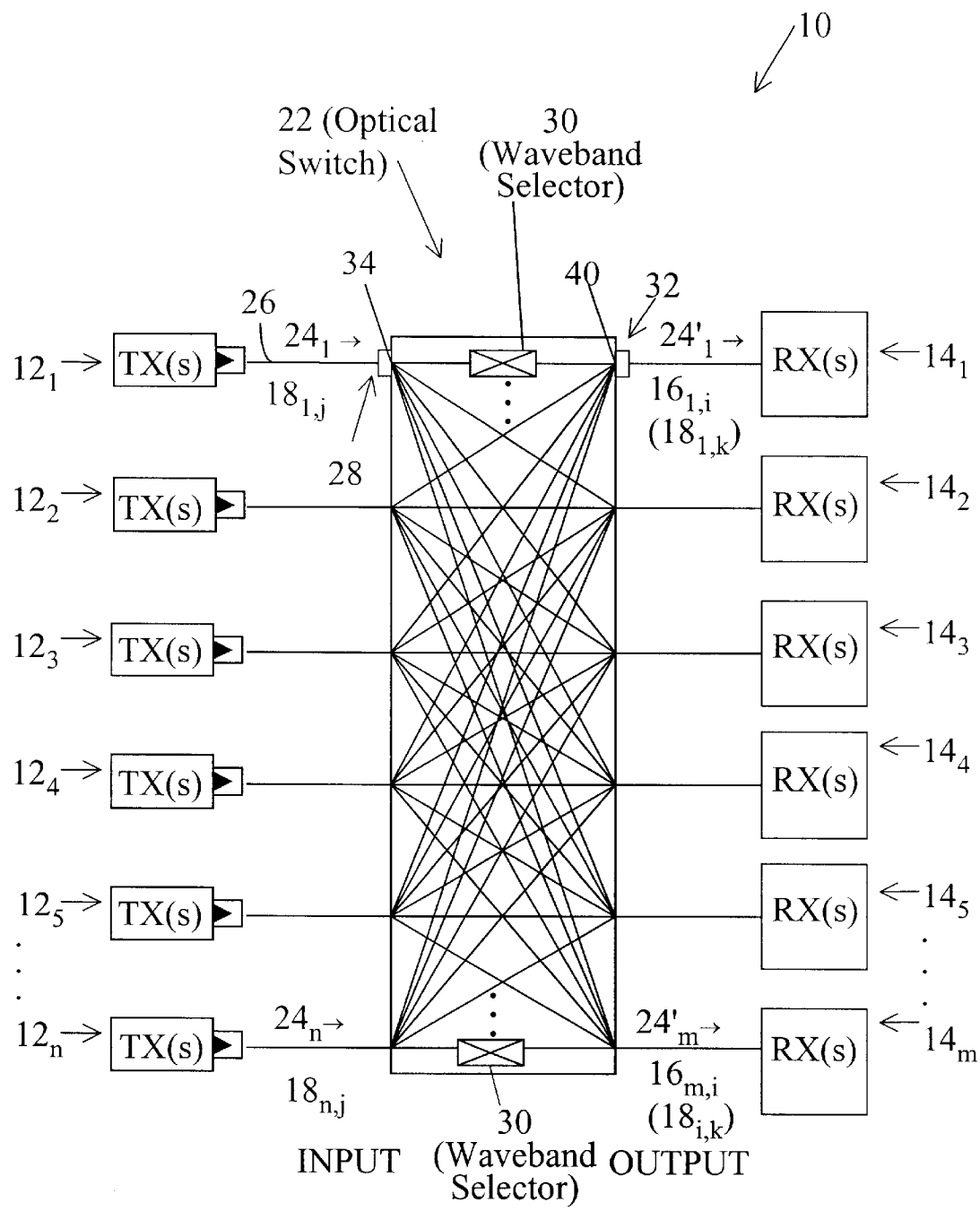

The operation of optical systems 10 of the present invention will be described generally with reference to the drawings for the purpose of illustrating embodiments only and not for purposes of limiting the same.

Generally, the optical system 10 includes at least one optical transmitter 12 and at least one optical receiver 14, as shown in FIG. 1. Each transmitter 12 is configured to transmit information via one or more information carrying wavelengths $18_{i,k}$ contained in at least one waveband $16_{1,i}$ to the receivers 14. Each receiver 14 is configured to receive the information carried via one or more of the information carrying wavelengths $18_{i,k}$. As used herein, the term "information" should be broadly construed to include any type of data, instructions, or signals that can be optically transmitted.

As shown in FIG. 1, the system 10 further includes at least one intermediate optical processing node 20, such as an optical switch 22. The transmitter 12 is configured to transmit an optical signal 24 containing one or more information carrying wavelengths $18_j$ along signal transmission waveguide, i.e., fiber, 26 to the switch 22 via input port 28. The optical processing node 20 includes one or more waveband selectors, or selective element, 30 that are configured to pass and/or substantially prevent the passage of information in wavebands $16i$ to the receiver 14 via output ports 32. Because the information is being manipulated in wavebands, the individual information carrying wavelengths $18_j$ within the waveband $16_i$ do not have to be separated in individual wavelengths to be managed and processed. Also, the individual wavelengths $18_j$ within the waveband $16_i$ be varied in the system 10 without affecting the configuration of the optical processing node 20. Wavelengths $18_j$ in the original signal 24 but not within the waveband $16_i$ are prevented from passing through to the receivers 14.

In the present invention, optical signals 24 can be produced including a number of wavebands 16, each of which may contain one or more information carrying wavelengths in a continuous band of wavelengths or a plurality of wavelength bands. For example, a waveband 16 can be defined as having a continuous range of ~200 GHz containing 20 different information carrying wavelengths $18_{1-20}$ spaced apart on a 10 GHz grid. The bandwidth of each waveband can be uniformly or variably sized depending upon the network capacity requirements. Likewise, the bandwidth of the waveband is not restricted, but can be varied to accommodate varying numbers of wavelengths.

Generally, systems 10 of the present invention are configured so that the optical processing nodes do not separate and process individual information carrying wavelengths during transmission from the transmitter to the receiver. Instead, optical processing nodes 20 are configured to process the information in wavebands that may include any number of individual information carrying wavelengths. The processing of information in wavebands decreases the complexity involved in processing large numbers of channels, while increasing the flexibility of optical components deployed in the transmission path between transmitters and receivers. The bandwidth and number of information carrying wavelengths within a waveband in a network can be statically or dynamically allocated depending upon the information traffic flow in a given network segment.

FIG. 2 shows a more general arrangement of the system 10, which includes a plurality of transmitter $12_n$ optically connected via the switch 22 to a plurality of receiver $14_m$. Analogous to FIG. 1, each transmitter $12_n$ transmits an optical signal $24_n$ which includes one or more wavelengths $18_{n,j}$ through a waveguide $26_n$ to an input port $28_n$ of the switch 22. It will be appreciated that each transmitter may include one or more sources to transmit and one or more wavelength signals. Likewise, each receiver may include one or more detectors for receiving the signals.

An optical distributor 34, such as a demultiplexer 36 and/or a splitter 38, is provided in the input port $28_n$ to distribute the signal $24_n$ to the waveband selectors $30_{n,m}$. An optical combiner $40_m$, such as a wavelength division multiplexer 42 or a coupler 44, is generally included to combine the wavelengths $18_{m,k}$ in waveband $16_{m,i}$ emerging from the waveband selectors $30_{n,m}$ and provide a modified signal $24'_m$. The modified signal $24'_m$ exits the switch through the output port $32_m$ and passes along waveguide 26 to the receiver $14_m$.

For convenience and clarity, FIG. 2 shows only a waveband selector 30 connecting input port $28_1$ to output port $32_1$. However, it should be understood that the switch 22 will generally include at least one waveband selector 30 between each input port 28 and each output port 32. It is also noted that in some networks it is not necessary that corresponding input and output ports, e.g. $28_1$ and $32_1$ be connected to loop a signal back to its point of transmission. In addition, reference numeral subscripts are generally not used in the remainder of the description to simplify the nomenclature.

Transmitters 12 used in the system 10 can include one or more optical emitters and sources that provide continuous wave and/or pulsed beams, such as one or more modulated lasers as is known in the art. The transmitter 12 may also include narrow band incoherent sources such as described in U.S. Pat. Nos. 5,191,586 and 5,268,910 issued to Huber or other optical sources for producing optical signals. Information can be directly or indirectly, e.g., externally, modulated, or alternatively upconverted, onto an optical wavelength, and the information itself may be a time division multiplexed signal.

The transmitter 12 can also be used to provide multiple information carrying wavelengths using techniques such as described in U.S. Pat. No. 5,400,166. Multiple information carrying wavelengths can be placed on a single carrier from the transmitter 12 using techniques, such as subcarrier modulation (SCM). SCM techniques are described in U.S. Pat. Nos. 5,101,450, 5,134,509, and 5,301,058 issued to Olshansky, U.S. Pat. No. 4,989,200 issued to Olshansky et al., U.S. Pat. No. 5,432,632 issued to Watanabe and 5,596,436 issued to Sargis et al.

The transmitters 12 may be coupled to an external electrical network or part of an optical-electrical-optical (O/E/O) signal regenerator within an optical network. One skilled in the art will appreciate that the selection of the transmitter 12 and the number of information carrying wavelengths will depend upon the desired information transfer rates for a particular transmitter/receiver system at the respective nodes. While the present invention provides the ability to substantially upgrade the transfer rate for the node, it does not require that older, slower nodes be upgraded upon implementation of the present invention.

Consistent with the discussion regarding the transmitter 12, the receiver 14 and transmission fiber 26 does not have to be upgraded to be compatible with the present invention. In the present invention, the capabilities of the receiving system can be taken in account when establishing wavebands to be transmitted to a particular receiver 14.

As shown in FIG. 3, the receiver 14 will generally be used to separate the individual information carrying wavelengths $18_{i,k}$ in each waveband $16_i$ contained in the modified signal $24'$ and convert the information to one or more electrical signals. The receiver may include a number of a wavelength filters, such as Bragg gratings or demultiplexers, in combination with an optical to electrical converter (O/E), such as a photodiode, to provide for direct detection of the individual wavelengths. The receiver 14 may also provide for indirect detection of the individual wavelengths, such as by using coherent detector arrangements.

Figure 4:
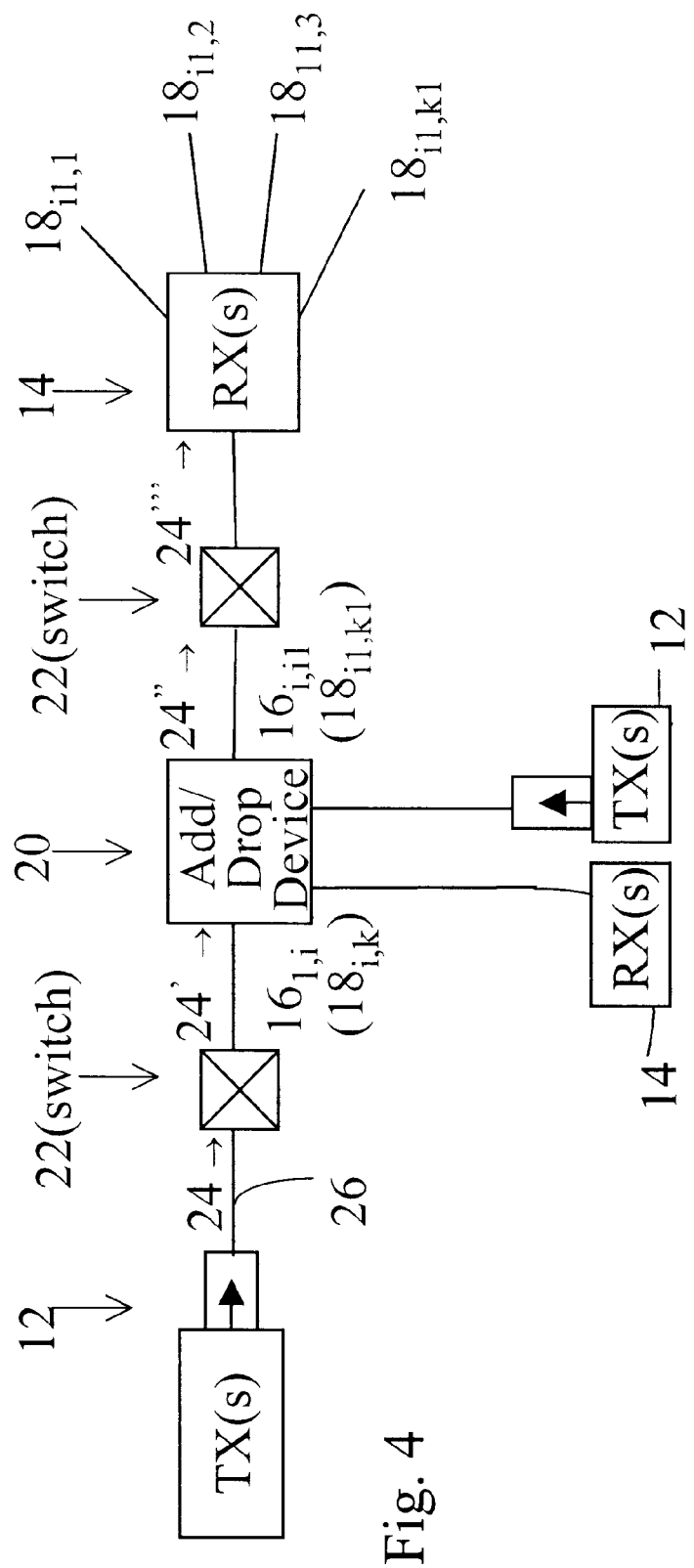

Referring to FIG. 4, the system 10 may include other types of intermediate processing nodes 20, such as add and/or drop devices. The other intermediate processing nodes can be employed to selectively modify the wavebands in the signal 24' and pass a further modified signal 24" to successive switches 22 and to the receivers 14. The subsequent switches 22 between other intermediate processing nodes 20 and the receivers 14 can be used to further process the signal 24" to produce a further modified signal 24'" which may include waveband subset $16_{i1}$. The optical add and/or drop devices/ports can be embodied as a 2×2 switch that can provide for 100% programmable add/drop capability or by employing directional devices, such as couplers and/or circulators, with or without waveband selectors 30 to provide varying degrees of programmability, as will be further discussed.

The receiver 14 can also be used to further distribute the signal 24'" as a part of an O/E/O signal regenerator. One skilled in the art will appreciate that in an O/E/O regenerator the optical wavelengths received by the receiver 14 do not necessarily have to correspond to the optical wavelengths at which the information is further transmitted.

Waveband selectors 30 generally include at least one filter, gate, and/or switch configured to pass and/or substantially prevent the passage of at least one waveband 16 received from the inlet port 28 to the outlet port 32. A signal is generally considered to be substantially prevented from passage, if the signal is sufficiently attenuated such that a remnant of the attenuated signal that passes through the waveband selector does not destroy signals that have been selectively passed through the optical processing node 20. For example, a 40 dB attenuation of a signal will generally be sufficient to prevent cross-talk interference between remnant signals and signals being selectively passed through the optical processing node 20.

Figure 5:
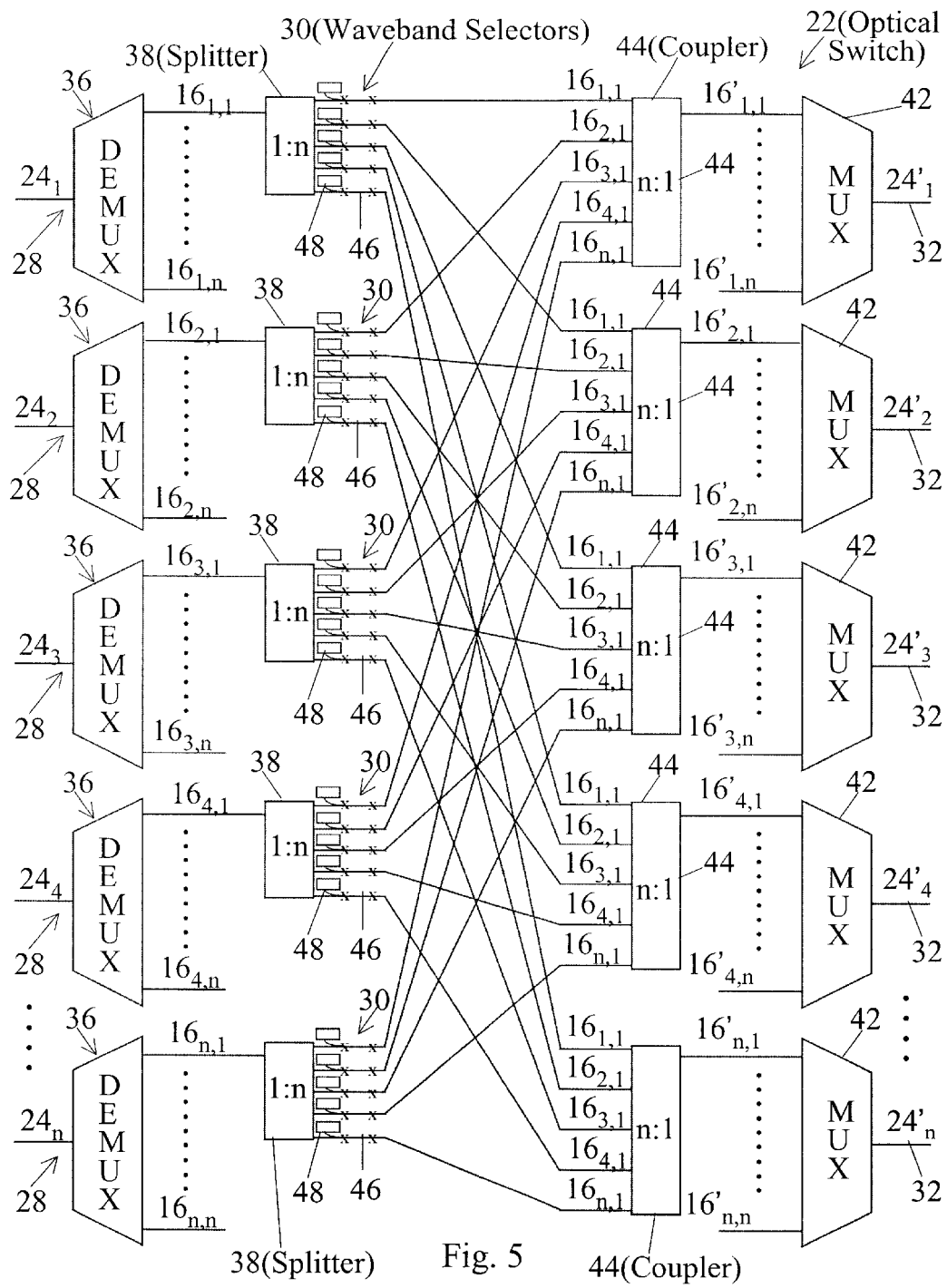
FIGS. 5–8(b) depicts waveband selectors of the present invention.

In an embodiment shown in FIG. 5, the switch 22 includes a waveband demultiplexer 36 and an optical signal splitter 38 coupled via a doped optical fiber 46 to the multiplexer 42 at the output port 32. When an optical signal is to be passed to the output port 32, the doped fiber is supplied with energy from the switch pump 48 to overcome the absorption of the doped fiber 46. The amount of energy supplied by the pump 48 can be controlled to selectively amplify or attenuate a signal being passed through the waveband selector 30. In the absence of optical pump energy, the doped fiber 46 will absorb the optical signal, thereby substantially preventing the passage of that portion of the signal to the outlet port 32. In the embodiment of FIG. 5, the wavebands can be switched to any number of output ports including one to one switching and one to many broadcasting.

The dopant in the doped optical fiber 46 can be erbium or any other dopant including other rare earth elements that can render the fiber transmissive in one state and substantially less transmissive in another state. The selection of a dopant in the doped fiber will depend upon the information carrying wavelengths that are to be switched in the system. Also, mechanical, electro-optic, liquid crystal, semiconductor, and other types of switches along with gratings, filters and gates, can be substituted for or used in combination with doped fiber 46 to achieve desired characteristics in the switch 22.

The waveband selector 30 may include reflective ($\geq 50\%$ reflectance) and/or transmissive ($\leq 50\%$ reflectance) selective elements that can be used to pass, either reflect or transmit, any of the wavebands 16 that comprise the signal 24. The waveband selector 30 may employ Mach-Zehnder filters, Fabry-Perot filters, and Bragg gratings to perform the waveband selection.

Figure 6A:
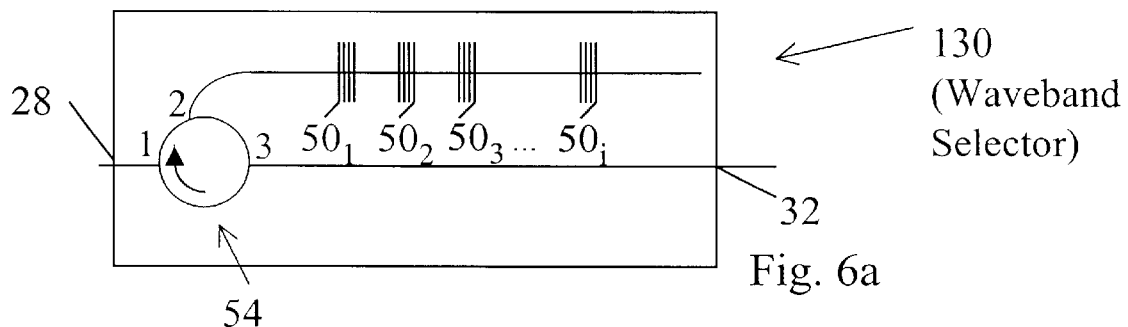
Figure 6B:
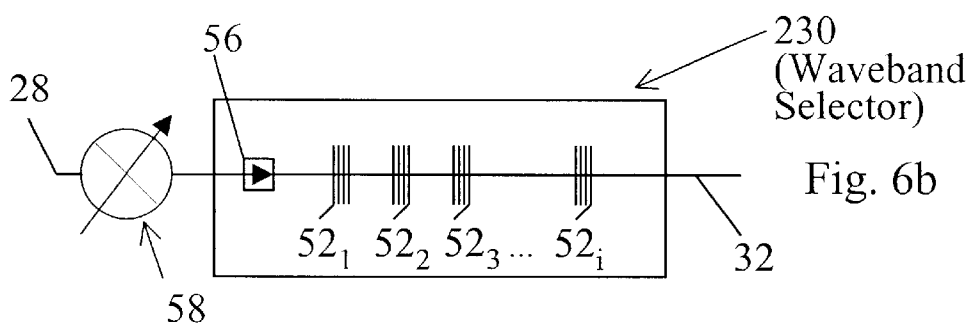

As shown in FIGS. 6(a) and 6(b) waveband selectors 130 and 230, respectively, can include a plurality of in-fiber reflective Bragg gratings 50 (FIG. 6a) and/or transmissive Bragg gratings 52 (FIG. 6b), to pass selected wavebands to the output ports 32. Each grating, 50 and 52, can be provided to pass selected wavebands to output ports 32. Alternatively, the waveband selector 30 may include a series of multiple Bragg gratings that provide for piecewise coverage of the waveband. In the case of a multiple grating waveband selector, some separation of the wavelengths in the waveband will occur between gratings, but the multiple gratings are collectively operated to pass or substantially prevent the passage of the waveband. The multiple grating selector can be tuned to individual idler gaps or telescoped to one or more common idler gaps to decrease the idler gap bandwidth.

Figure 7:
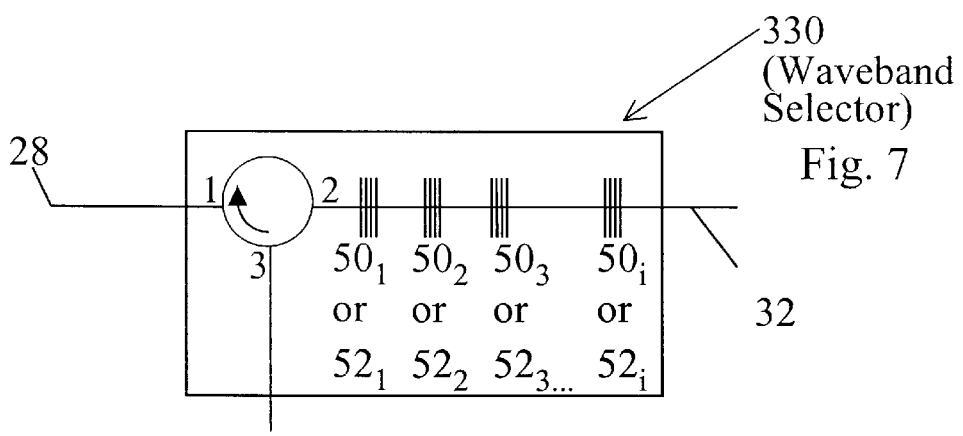

The number of gratings in FIGS. 6 and 7 is shown as being equal to the number of wavebands 16 being switched. However, the number of selectors provided in the switch does not necessarily have to correspond to number of wavebands 16 currently in the system. For example, the configurations shown in FIGS. 5–11 may also be suitable for use in add/drop multiplexers, as well as demultiplexers or multiplexers, in which any number of wavebands can be processed.

It may also be advantageous to provide sub-wavebands within the wavebands 16 of varying size that can be received, divided into the sub-wavebands, and the sub-wavebands can further transmitted to other receivers within the system. The waveband selectors 30 can also be used to pass multiple wavebands to reduce the number of components in the system 10. In addition, the wavebands 16 can be selected to overlap to allow one or more wavelengths 18 to be transmitted in multiple wavebands 16.

As shown in FIG. 6(a), a waveband selector 130 can include a three port circulator 54 used in conjunction with the plurality of reflective Bragg gratings 50 using a configuration similar those discussed in U.S. Pat. Nos. 5,283,686 and 5,579,143 issued to Huber, and 5,608,825 issued to Ip. In FIG. 6(b), a waveband selector 230 employs transmissive gratings 52 to transmit selected wavebands to the output ports 32 and reflect the remaining wavebands. An optical isolator 56 can be incorporated to prevent reflected wavebands from propagating back to the input ports 28. One skilled in the art will appreciate that directional couplers and other directional devices can be substituted for the optical circulators with appropriate circuit modifications.

The optical processing node 20 may include a wavelength converter 58 to provide for switching one or more of the wavelengths in the transmitted signal 24. In FIG. 6(a), the wavelength converter 58 is shown before the waveband selector 30; however, the wavelength converter 58 may also be positioned after the waveband selector 30 and operated accordingly.

Similarly in FIG. 7, a waveband selector 330 can be used with one or more directional devices, such as a circulator or a coupler, with either reflective or transmissive waveband gratings, $50_i$ or $52_i$, to select wavebands. It will be appreciated that the selector 330 can be employed as an add and/or drop device/port, as well as a filter or in a demultiplexer or multiplexer in the system 10.

Figure 8A:
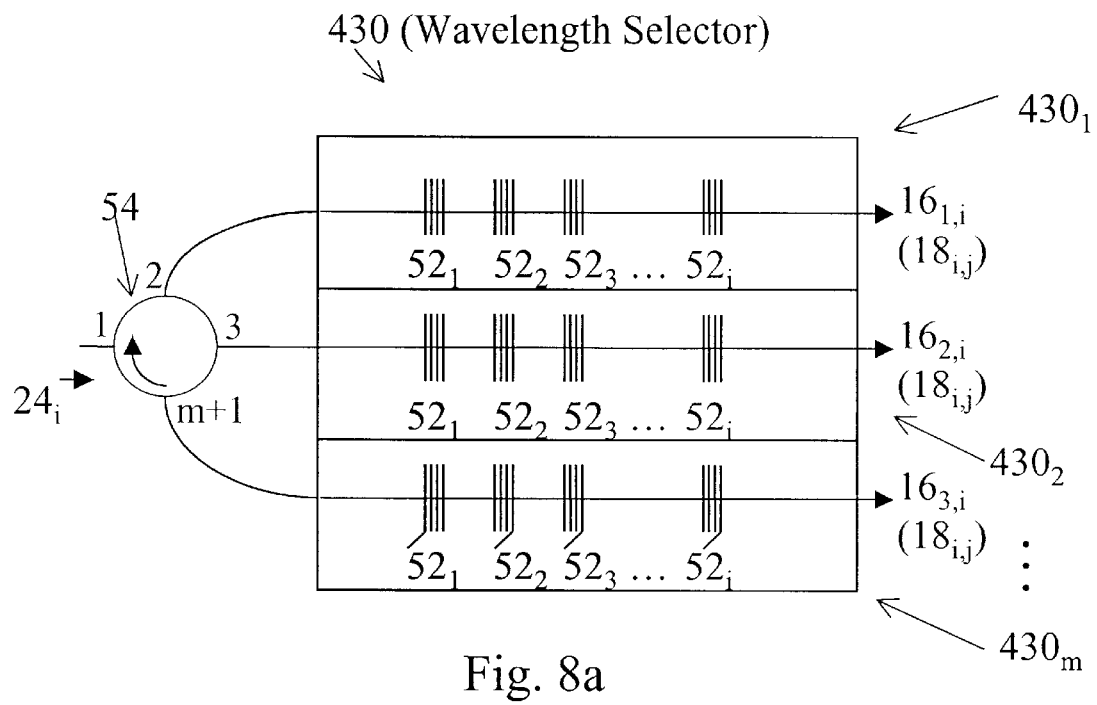

The optical distributor 34 associated with the input port 28 can be embodied as an optical splitter to split the signal 24 and distribute a portion of the entire signal 24 to each of the output ports 32. As shown in FIG. 8(a), the optical distributor 34 can be embodied as a circulator 54 to provide the entire signal to each waveband selector 430. Wavelengths within waveband of the selector 230 are transmitted to the output port 32, while the remaining wavelengths are reflected by the transmissive gratings and circulated to successive ports.

Figure 8B:
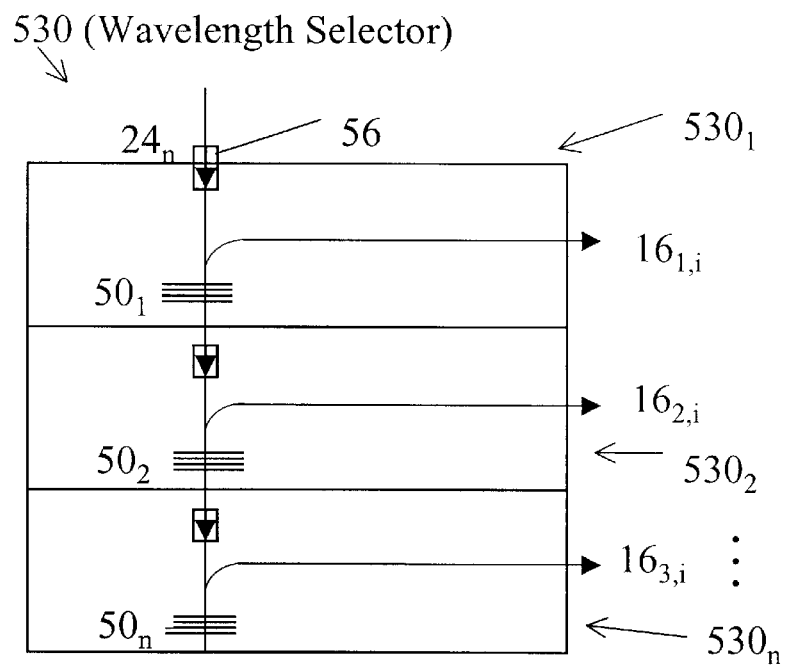

Likewise, optical couplers can serve as the distributor 34 to provide the entire signal to waveband selector 530 (FIG. 8(b)). One skilled in the art will appreciate that directional devices, such as multiple three port circulators and/or coupler, can be cascaded in various other configurations equivalent to those shown in FIGS. 8(a) & (b). The gratings, 50 or 52, could be prepared having a reflectivity and transmittance of less than 100% to allow a portion of signal to be transmitted and reflected.

The fiber Bragg gratings 50 and 52 used in the switch 22 can be permanently and/or transiently produced. Embodiments of the present invention incorporate fixed and/or tunable permanent Bragg gratings, 50 and 52 as the waveband selectors 30. The permanent gratings used in the present invention can be prepared by conventional methods, such as by using ultraviolet (UV) light to irradiate a $GeO_2$ doped fiber core. Such methods are discussed in U.S. Pat. No. 4,725,110 issued to Glenn et al., U.S. Pat. Nos. 5,218,655 and 5,636,304 issued to Mizrahi et al., which are incorporated herein by. reference, and related patents.

The permanent gratings can be tuned to provide for reflectance of a waveband in one mode and transmittance in another mode. Tuning of the grating properties can be accomplished mechanically (stretching), thermally, or optically, such as discussed in U.S. Pat. Nos. 5,007,705, 5,159,601, and 5,579,143, and by M. Janos et al., Electronics Letters, v32, n3, pp. 245–6, electronically, or in some other appropriate manner.

A limitation of tunable permanent gratings is that a portion of the wavelength band can not be used to transfer signals. The unused portion of the wavelength band, called an "idler" gap, is necessary to provide each permanent grating with a gap in the wavelength spectrum in which the grating will not affect a signal encountering the grating.

Transient reflective or transmissive gratings, $50^T$ and $52^T$, respectively, could also be used in the waveband selector 30. Transient gratings can be used to reduce or eliminate the need for idler gaps in the transmission wavelengths and provide increased flexibility in the wavelength selectivity of the switch 22.

Transient gratings, either $50^T$ or $52^T$, can be formed in a portion of the fiber in which the refractive index of the fiber can be transiently varied to produce a grating. In an embodiment, the fiber portion is doped with Erbium, other rare earth elements, such as Yb and Pr, and/or other dopants that can be used to vary the refractive index of the fiber to produce a grating. In another embodiment, the transient grating can be formed in a fiber section that contains a permanent grating to provide a combined performance grating and/or to establish a default grating in the absence of the transient grating.

Figure 9:
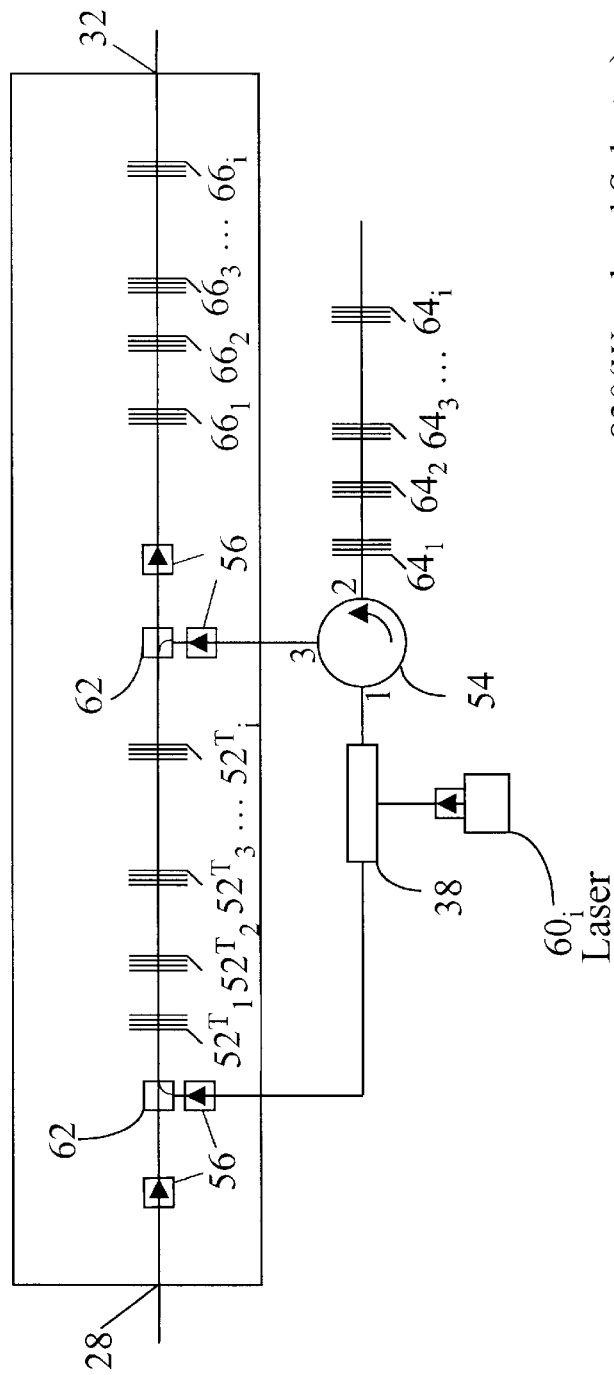
Figure 11:
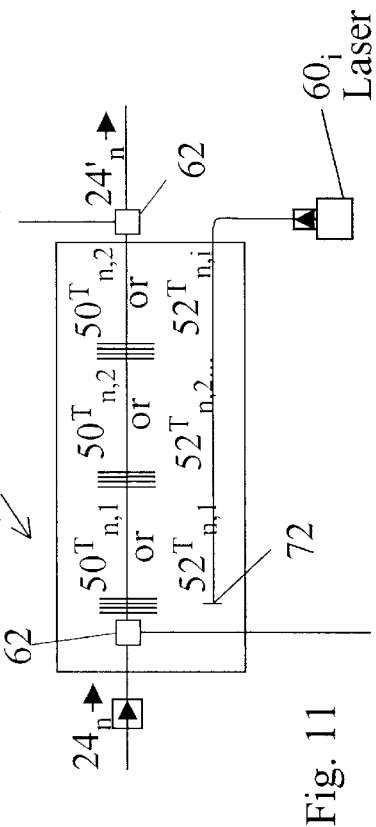

As shown in FIGS. 9–11, transient gratings can be written by introducing a grating writing beam either directly into the transmission fiber or by coupling the writing beam into the transmission fiber. One or more transient grating writing lasers $60_i$ are used to introduce a transient grating writing beam into the doped portion of the signal waveguide 26. In a waveband selector 630 shown in FIG. 9, the writing beam is split into two paths and introduced into the transmission fiber 26 via ports 62. A plurality of narrow wavelength reflective gratings $64_i$ are positioned in one of the writing beam paths to control the position of the standing wave in the waveguide 26 by introducing a time delay on the wavelengths of the writing beam. Narrow wavelength reflective or transmissive gratings, $64_i$ or $66_i$, can also be used to remove the writing beam from the transmission fiber 26.

As shown in FIG. 10, the writing beam can also be reflected back upon itself using spaced narrow wavelength reflective gratings $64_i$, to form a standing wave and produce a transient gratings $50^T$ in waveband selector 730. The grating writing lasers $60_i$ can be operated in conjunction with modulators 68 and pulsing switches 70 to control the coherence of the writing lasers $60_i$ and the resulting transient gratings $50^i$. A waveband selector 830, shown in FIG. 11, can also be configured with a reflector 72 in a coupled fiber to establish a standing wave by reflecting the writing beam back upon itself to form the standing wave in a manner similar to that described with respect to FIG. 10.

Single wavelength continuous writing beam arrangements have been used for signal identification and pattern recognition as discussed by Wey et al., "Fiber Devices for Signal Processing", 1997 Conference on Lasers and Electro-Optics, Baltimore, Md. Also, U.S. Pat. No. 5,218,651 issued to Faco et al., which is incorporated herein by reference, describes two beam methods for producing a transient Bragg grating in a fiber.

Figure 12:
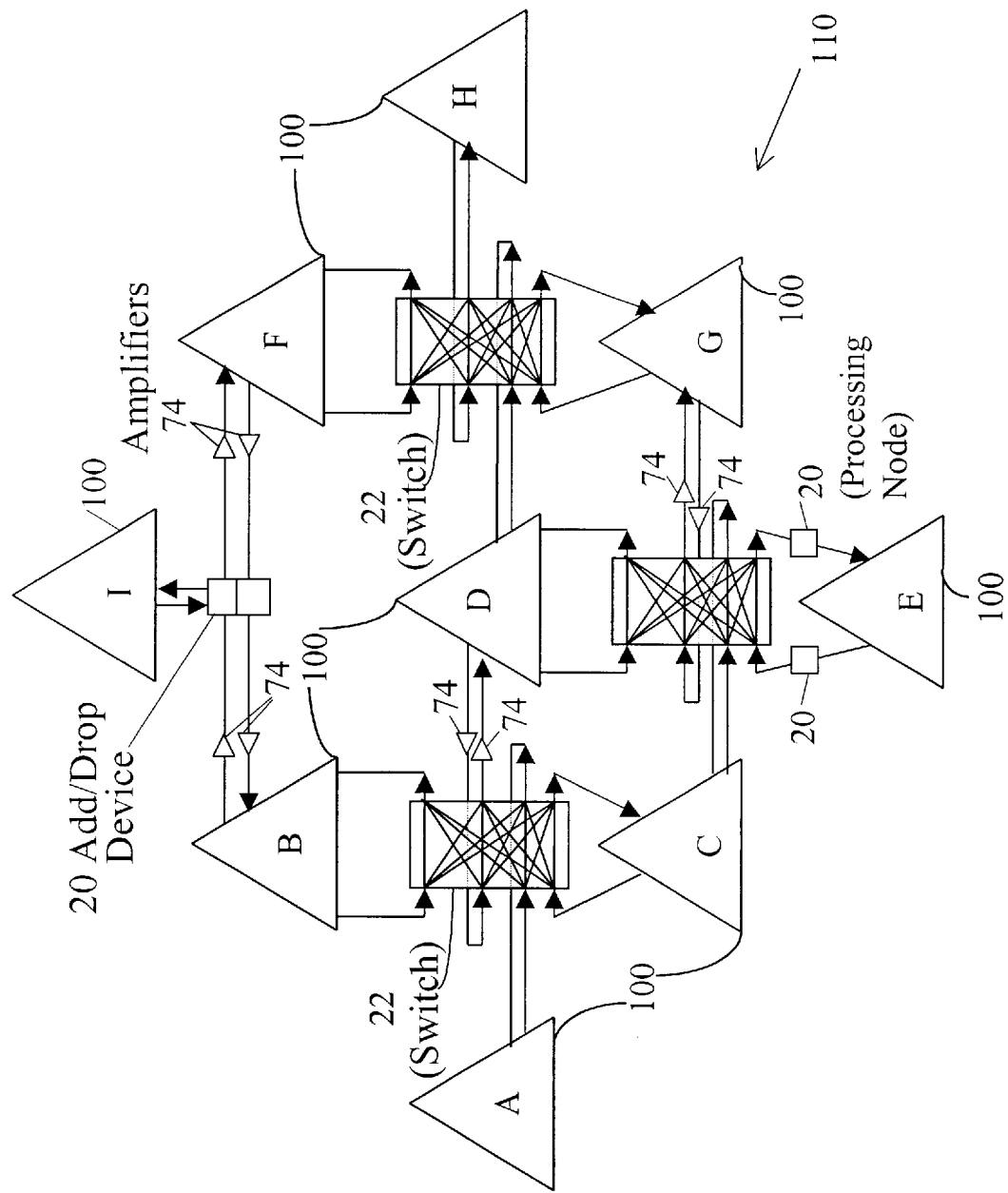
Figure 13:
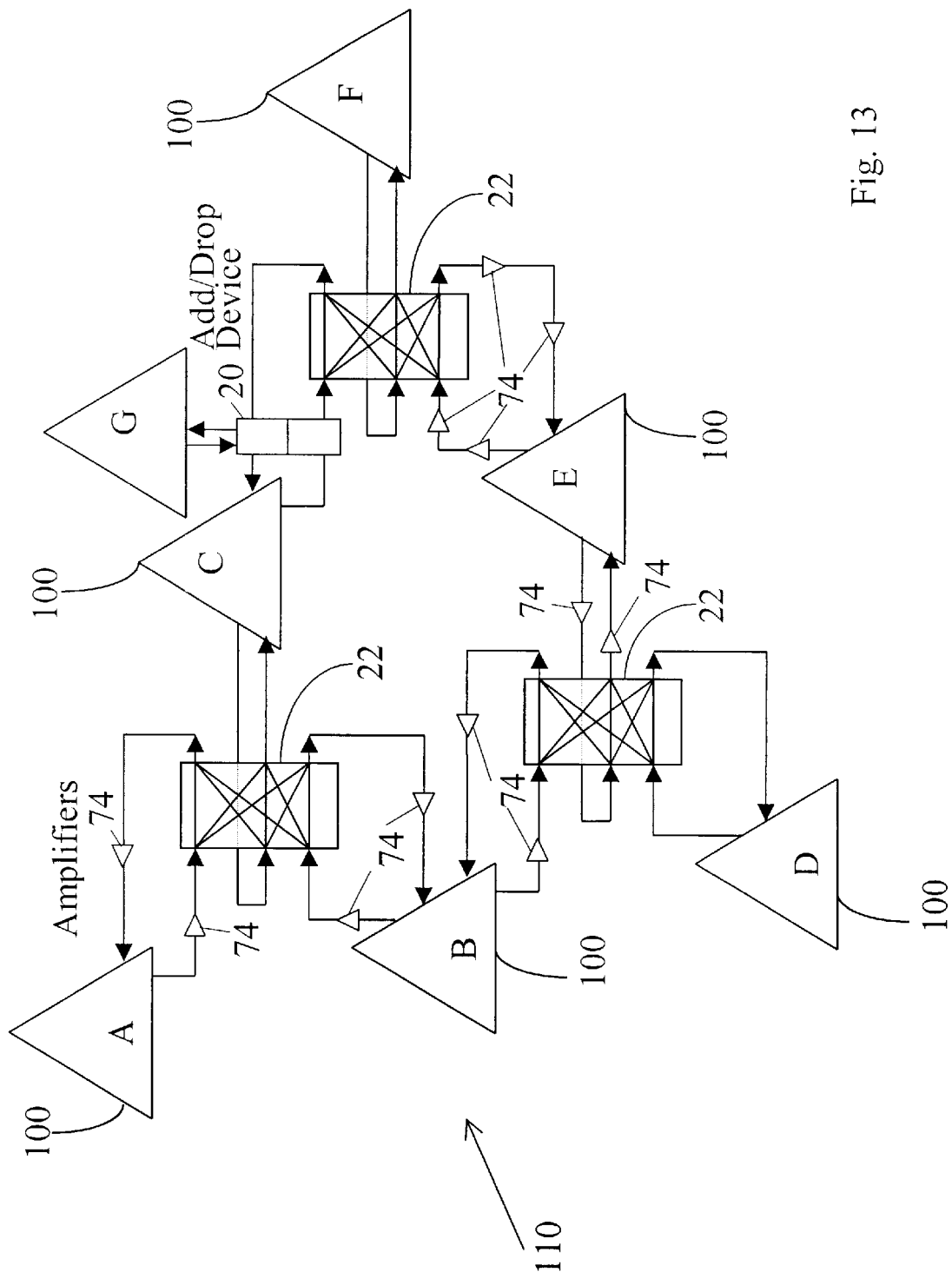

In systems 10 of the present invention, the switch 22 can be used to optically connect a transmitter and a receiver (FIG. 1) in a 1×1 configuration or a plurality of nodes 100 in an n×m configuration (FIGS. 12–13). In a 1×1 configuration, the switch 22 can be useful for dropping wavebands or for varying the waveband characteristics (gain trimming) of the signal.

The nodes 100 used in the system 10 may contain various system components including optical transmitters, receivers, and/or other processing equipment, such as switches depending upon whether the node is an origination (transmitting signals) and/or a destination (receiving signals) node, and whether it is a terminal node. The system 10 may further include other optical transmission equipment, such as optical amplifiers 74, and other optical processing nodes 20, such as optical add/drop multiplexers, between the switches and the nodes 100 as may be useful in a given system.

The 4×4 switch arrangement shown in FIG. 12 is representative of a north-south-east-west communication system. One skilled in the art will appreciate that the nodes/switch arrangements can be varied to accommodate various network configurations. For example, a 3×3 arrangement is shown in FIG. 13. The arrangements in FIGS. 12 and 13 show the cross connections of the switches 22, but do not show the waveband selectors within the switches 22.

The flow of communication traffic between the nodes can take place using a variety of optical waveband hierarchies. In an embodiment, the optical wavebands are established and wavelengths assigned based on both the signal origination node and the signal destination node to avoid the need for wavelength conversion in the optical network.

For example, the spectrum of wavelengths used with each receiver can be divided into wavebands and the destination wavebands assigned to transmitters. The assignment may be static or dynamically controlled at the network management level so no overlap occurs in the wavebands assigned to each transmitter from the various receivers. Dynamic control of the waveband assignment provides flexibility in the wavelength management in the system 10 and can be performed at various points in the system, such as at the client system, e.g., SONET, SDH, ATM, IP interface with the optical network.

Waveband hierarchies in which the origination and destination nodes are paired are particularly useful in communication systems in which a signal is being sent from the origin to one destination, such as in telephone communication systems. In addition, the present invention can also accommodate the necessary protection systems to provide multiple paths to the same destination by proper allocation of the wavelengths.

In a multiple destination system, such as a cable television system, it may be more appropriate for the wavebands to be determined based solely on the origination node of the signal. Waveband selectors can be included in the switches 22 to pass signals corresponding to a particular source to any number of destination nodes. The switch 22 can provide further control over the distribution of signals by passing broadcast signals to a distribution segment only upon a subscriber's request. The CATV provider, in response to a programming request, can centrally control the switch to deliver the signal to the requester. In the absence of an express request by a subscriber the signal would not be broadcast to the segment. The limited availability of the signal on a segment may discourage pirating of programming signals.

Switches 22 of the present invention can also be used for remote switching and routing of communication traffic in the event of a fault in the system. For example, in FIG. 12 if a signal were to travel from node A to node C, the typical path would be through the switch connected between nodes A and C. However, if a fault occurs in the line from the switch to node C, it may be desirable to route traffic from node A through node D to node C. Upon detection of the fault, the network management system could reconfigure the switches 22 in the system 10 to reroute the traffic or switch to a previously configured protection route.

As can be seen, the present invention provides for flexibility in optical transmission systems. In addition, the present invention provides for increased transmission capacity without the commensurate increase in complexity that was present in the prior art systems.

Those of ordinary skill in the art will appreciate that numerous modifications and variations that can be made to specific aspects of the present invention without departing from the scope of the present invention. It is intended that the foregoing specification and the following claims cover such modifications and variations.

What is claimed is:

1. An optical transmission system comprising:
   at least one optical transmitter configured to transmit information via at least one information carrying wavelength;
   at least one optical receiver configured to receive: the information transmitted via the at least one information carrying wavelength; and,
   at least one optical processing node including an optical splitter configured to split an optical signal including at least one waveband comprised of a plurality of information carrying wavelengths into a plurality of split optical signals, a waveband demultiplexer configured to demultiplex the optical signals into a plurality of wavebands, and at least one waveband selector, each waveband selector configurable to selectively pass, in a first configuration, and to substantially prevent the passage of, in a second configuration, one of the optical wavebands from-said at least one transmitter to said at least one receiver through a combiner configured to combine the optical wavebands passed by each waveband selector.

2. The optical transmission system of claim 1, wherein said at least one waveband selector is configured to selectively pass and substantially prevent the passage of said at least one optical waveband without separating said plurality of information carrying wavelengths into individual information carrying wavelengths.

3. The optical transmission system of claim 1, wherein each of said at least one waveband selectors is configured to only selectively pass and substantially prevent the passage of optical wavebands.

4. The optical transmission system of claim 1, wherein said at least one optical processing node includes an optical switch having input ports corresponding to said at least one transmitter and output ports corresponding to said at least one receiver and said information carrying wavelengths are switched from said input ports to said output ports in said at least one optical waveband by said at least one waveband selector.

5. The optical transmission system of claim 4 wherein said switch includes
   a waveband demultiplexer corresponding to each input port and configured to receive and separate an optical signal containing the at least one information carrying wavelength into separate optical wavebands signals,
   an optical splitter in optical communication with and corresponding to each of the separated waveband signals from each of said optical demultiplexers, each of said optical splitters configured to split the separated waveband signals into a number of split waveband signals corresponding to each output port,
   at least one said waveband selectors being positioned to receive each split waveband signal and configurable to pass and to substantially prevent the passage of the split waveband signal to said corresponding output port, and
   an optical combiner corresponding to each output port and configured to receive the split waveband signals from each of said waveband selectors corresponding to said output port and provide a combined optical waveband signal to said output port.

6. The optical transmission system of claim 5 wherein at least one said waveband selectors includes a doped optical fiber configured to allow an optical waveband to pass through the fiber in one mode and to substantially prevent the passage of the optical waveband through the fiber in another mode.

7. The optical transmission system of claim 6 wherein doped optical fiber includes an erbium doped fiber coupled to an optical energy pump source, the erbium fiber being configured to substantially prevent the passage of the optical waveband signal when said fiber is not pumped with optical energy from said optical energy pump source and Lo allow said optical waveband signal to substantially pass through the fiber when pumped with optical energy from said pump source.

8. The optical transmission system of claim 7 wherein said optical energy pump source is configured to control the intensity of the optical waveband passing through the fiber by varying the optical energy pumped into the erbium doped fiber.

9. The optical transmission system of claim 5 wherein at least one of said waveband selectors includes at least one of doped fiber, mechanical, electro-optic, liquid crystal, and semiconductor switches, and combinations thereof, in which said at least one switch can be operated to pass at least one waveband in one mode and substantially prevent the passage of said at least one waveband in another mode.

10. The optical transmission system of claim 1, wherein said at least one optical processing node includes an optical add/drop device containing said at least one waveband selector to selectively add an optical waveband to be transmitted to said at least one receiver and to selectively drop an optical waveband transmitted by said at least one transmitter.

11. The optical transmission system of claim 1, wherein said at least one optical processing node includes ports selected from the group consisting of add devices, drop devices and combinations thereof.

12. The optical transmission system of claim 1, wherein said at least one optical processing node includes a demultiplexer configured to receive the information carrying wavelengths from said at least one transmitter and distribute the information carrying wavelengths in optical wavebands to at least one of said at least one receivers.

13. The optical transmission system of claim 1, wherein said at least one optical processing node includes a multiplexer configured to receive optical wavebands passed by said at least one waveband selector and provide a multiple optical waveband signal to said at least one receiver.

14. The optical transmission system of claim 1 wherein said at least one waveband selector includes transmissive and reflective waveband selectors including at least one of optical filters, Bragg gratings, gates, switches and combinations thereof.

15. The optical transmission system of claim 1 wherein said at least one waveband selector includes an optical waveguide configured to provide for the formation of an optical grating therein.

16. The optical transmission system of claim 1 wherein said at least one waveband selector includes a permanent Bragg grating selected from the group consisting of transmissive and reflective operated permanent gratings.

17. The optical transmission system of claim 1 wherein said at least one waveband selector includes a tunable grating.

18. The optical transmission system of claim 17 wherein said tunable grating includes at least one of mechanically, thermally, optically, and electronically tunable gratings, and combinations thereof.

19. The optical transmission system of claim 1 wherein said at least one waveband selector includes an optical circulator having a first port optically connected to said at least one transmitter, a second port optically connected between said first port and a reflective grating configured to reflect said at least one waveband and a third port optically connected to pass a reflected waveband from said reflective grating to said at least one receiver.

20. The optical transmission system of claim 1 wherein said at least one waveband selector includes an optical circulator having a first port optically connected to said at least one transmitter, a second port optically connected to said first port and a transmissive grating configured to transmit said at least one waveband from said second port to said at least one receiver.

21. The optical transmission system of claim 1 wherein:
said at least one optical receiver includes a plurality of optical receivers;
said at least one optical transmitter includes a plurality of optical transmitters; and,
said optical processing node includes a switch optically connecting said transmitters and said receivers and configured to pass optical wavebands of information from said transmitters to said receivers.

22. The optical transmission system of claim 1 wherein said optical processing node is configurable to provide any of one or more wavebands from any of said at least one transmitters to any of said at least one receivers.

23. The optical transmission system of claim 1, further comprising:
a demultiplexer corresponding to each of said at least one transmitters and configured to receive and separate the plurality of individual information carrying wavelength signals; and,
a plurality of wavelength converters optically connecting said demultiplexer and said at least one waveband selector and configured to convert the plurality of information carrying wavelength signals from said demultiplexer into information carrying wavelengths within said at least one waveband.

24. The optical transmission system of claim 1 wherein said at least one transmitter includes at least one modulated laser for providing at least one of said information carrying wavelengths and said receiver includes a plurality of photodiodes corresponding to said plurality of information carrying wavelengths in said at least one optical waveband.

25. The optical transmission system of claim 1 wherein said at least one waveband selector comprises an in fiber Bragg grating configured to selectively pass said optical waveband including said plurality of information carrying wavelengths.

26. A method of passing information to a destination comprising:
producing an optical signal including a plurality of information carrying wavelengths;
transmitting the optical signal;
splitting the optical signal to produce a plurality of split optical signals;
providing a waveband demultiplexer configured to demultiplex the optical signals into a plurality of wavebands and a waveband selector configurable to selectively pass, in a first configuration, and to substantially prevent the passage of, in a second configuration, a selected optical waveband of one of the split optical signals including more than one of the plurality of information carrying wavelengths to a destination without separating the individual information carrying wavelengths and a combiner to combine the selected optical wavebands passed by the. waveband selectors; and,
configuring the selector to pass the selected optical waveband to the destination.

27. The method of claim 26 further comprising
separating the information carrying wavelengths from the waveband at the destination into individual information carrying optical wavelengths; and,
reproducing the information contained in the information carrying wavelengths in electronic form.

28. The method of claim 27 wherein said passing includes providing a Bragg grating to selectively reflect or transmit the optical waveband of information to the destination.

29. A method of passing information from an origin to a destination comprising:
assigning a waveband comprised of a band of information carrying wavelengths to at least one destination;
providing an optical processing node including a waveband selector configurable to selectively pass, in a first configuration, and to substantially prevent the passage of, in a second configuration, the assigned waveband of information carrying wavelengths to the at least one destination without separating the individual Information carrying wavelengths in the waveband;
producing an optical signal including a plurality of information carrying wavelengths in the assigned waveband;
transmitting the optical signal to the optical processing node; and,
splitting and demultiplexing the optical signal to produce a plurality of split optical wavebands;
passing one of the split optical wavebands through the waveband selector in the optical processing node to selectively pass the assigned waveband of information carrying wavelengths to the at least one destination without separating the individual information carrying wavelengths.

30. The method of claim 29 wherein said passing includes providing a pumped erbium doped fiber in the waveband selector to selectively pass assigned wavebands to the at least one destination.

31. The method of claim 29 wherein said passing includes providing at least one grating selected from the group consisting of reflective and transmissive gratings and combinations thereof in the waveband selector to selectively pass assigned wavebands to the at least one destination.

32. An optical switch comprising:

at least one input port;

at least one output port;

an optical splitter having an input in optical communication with the at least one input port and a plurality of outputs a waveband demultiplexer configured to demultiplex the optical signals into a plurality of optical wavebands;

at least one waveband selector providing optical communication between said at least one input port and said at least one output port, wherein each waveband selector is configurable to selectively pass, in a first configuration, or to substantially prevent the passage of, in a second configuration, information in optical waveband including a plurality of information carrying wavelengths from one of the optical splitter outputs; and, a combiner configured to combine the optical wavebands passed by each waveband selector and provide a combined optical signal to said at least one output port.

33. The switch of claim 32 wherein said at least one waveband selector is configured to selectively pass and substantially prevent the passage of the information carrying wavelengths only as a part of said at least one optical waveband.

34. The system of claim 1 wherein a second waveband selector configurable to selectively pass and substantially prevent the passage of a sub-waveband of the at least one optical waveband, wherein the sub-waveband includes a plurality of information carrying wavelengths.

* * * * *